(12) United States Patent
Tada et al.

(10) Patent No.: US 7,780,014 B2
(45) Date of Patent: *Aug. 24, 2010

(54) POROUS WATER FILTRATION MEMBRANE OF VINYLIDENE FLUORIDE RESIN HOLLOW FIBER AND PROCESS FOR PRODUCTION THEREOF

(75) Inventors: Yasuhiro Tada, Ibaraki-Ken (JP); Takeo Takahashi, Ibaraki-Ken (JP); Masayuki Hino, Ibaraki-Ken (JP); Shingo Taniguchi, Fukushima-Ken (JP); Kenichi Suzuki, Ibaraki-Ken (JP); Toshiya Mizuno, Ibaraki-Ken (JP)

(73) Assignee: Kureha Corporation, Tokyo (JP)

( * ) Notice: Subject to any disclaimer, the term of this patent is extended or adjusted under 35 U.S.C. 154(b) by 985 days.

This patent is subject to a terminal disclaimer.

(21) Appl. No.: 11/578,425

(22) PCT Filed: Apr. 7, 2005

(86) PCT No.: PCT/JP2005/006863
§ 371 (c)(1),
(2), (4) Date: Oct. 13, 2006

(87) PCT Pub. No.: WO2005/099879
PCT Pub. Date: Oct. 27, 2005

(65) Prior Publication Data
US 2007/0241050 A1 Oct. 18, 2007

(30) Foreign Application Priority Data
Apr. 14, 2004 (JP) .............................. 2004-119506

(51) Int. Cl.
*B01D 39/00* (2006.01)
*B28B 3/20* (2006.01)
*B29C 47/00* (2006.01)

(52) U.S. Cl. .............................. 210/500.23; 210/500.27; 210/500.36; 210/500.42; 264/177.13; 264/178 R; 264/209.5

(58) Field of Classification Search ............ 210/500.23, 210/500.36, 500.42, 500.37; 264/41, 177.13, 264/177.14, 209.1, 203, 178 R, 176.1, 209.5; 428/357
See application file for complete search history.

(56) References Cited

U.S. PATENT DOCUMENTS 5,514,461 A 5/1996 Meguro et al.

(Continued)

FOREIGN PATENT DOCUMENTS

JP 58-93734 6/1983

(Continued)

*Primary Examiner*—Ana M Fortuna
(74) *Attorney, Agent, or Firm*—Wenderoth, Lind & Ponack, L.L.P.

(57) ABSTRACT

A composition is formed by blending a vinylidene fluoride resin having a relatively high molecular weight and an improved crystallinity represented by a difference Tm2−Tc of at most 32° C. between an inherent melting point Tm2 and a crystallization temperature Tc of the resin with a plasticizer and a good solvent for vinylidene fluoride resin, and the composition is melt-extruded into a hollow fiber-form. The hollow fiber-form extrudate is then cooled to be solidified from an outside thereof by introduction into cooling medium and subjected to extraction of the plasticizer and stretching, thereby forming a hollow fiber porous membrane of vinylidene fluoride resin characterized by co-presence of crystal oriented portion and crystal non-oriented portion recognizable by X-ray diffraction method. The resultant hollow fiber porous membrane of vinylidene fluoride resin has micro-pores of appropriate size and distribution, is excellent in mechanical strength represented by tensile strength and elongation at break and is useful as a water microfiltration membrane.

12 Claims, 2 Drawing Sheets

U.S. PATENT DOCUMENTS

| | | | |
|---|---|---|---|
| 5,698,101 A * | 12/1997 | Kopp et al. | 210/500.23 |
| 6,074,718 A * | 6/2000 | Puglia et al. | 428/36.5 |
| 6,299,773 B1 * | 10/2001 | Takamura et al. | 210/500.23 |
| 6,677,416 B2 * | 1/2004 | Sato et al. | 526/255 |
| 7,182,870 B2 * | 2/2007 | Minegishi et al. | 210/500.23 |
| 7,351,338 B2 * | 4/2008 | Tada et al. | 210/500.23 |
| 7,455,772 B2 * | 11/2008 | Tada et al. | 210/500.36 |
| 7,569,145 B2 * | 8/2009 | Tada et al. | 210/500.36 |
| 2003/0094409 A1 | 5/2003 | Minegishi et al. | |

FOREIGN PATENT DOCUMENTS

| | | |
|---|---|---|
| JP | 2000-309672 | 11/2000 |
| JP | 2001-179062 | 7/2001 |
| JP | 2002-66272 | 3/2002 |
| JP | 2003-320228 | 11/2003 |
| JP | 2004/081109 | 9/2004 |
| WO | 03/031038 | 4/2003 |

* cited by examiner

POROUS WATER FILTRATION MEMBRANE OF VINYLIDENE FLUORIDE RESIN HOLLOW FIBER AND PROCESS FOR PRODUCTION THEREOF

TECHNICAL FIELD

The present invention relates to a porous water filtration membrane of vinylidene fluoride resin hollow fiber suitable for water treatment and a process for production thereof.

Background Art

Hitherto, porous membranes of synthetic resins have been used in many technical fields as separation membranes for gas separation, gas-liquid separation, solid-liquid separation, etc., or as insulating materials, lagging materials, sound insulators and thermal insulators. Among these, for separation membranes for water treatment, the following properties are required as affecting the separation performances. First, the porous membrane is required to have an appropriate porosity in view of the separation efficiency and a uniform pore diameter distribution for a better separation accuracy. In addition, it is required to have a pore diameter optimum for an objective material to be separated. Further, the materials forming the membrane are required to have a chemical resistance against a chemical treatment after water treatment, weatherability, heat resistance, etc. Further, the materials are required to have sufficient elongation at break and strength at break as mechanical strengths for use as the porous membrane.

From the above viewpoints, conventionally developed porous membranes of polyolefin resins (e.g., Patent document 1 below) have left problems in respects of back washing and chemical resistance for ozone treatment after the use thereof as a separation membrane.

Vinylidene fluoride resins are excellent in weatherability, chemical resistance, heat resistance, strength, etc., and have been studied for their use as a porous membrane for separation. However, while the vinylidene fluoride resins have the above-mentioned excellent properties, they do not necessarily have desirable formability because of their non-adhesiveness and poor compatibility. In addition, development of porous membranes have been focused on the provision of a high porosity and a narrow pore diameter distribution for improving the separation performance, and no product having satisfactory mechanical strengths has been obtained. Accordingly, when a porous membrane is used as a filter membrane, a supporting membrane is superposed on the porous membrane to enhance the mechanical properties at present. Further, when used as a microfiltration membrane for water treatment, it is desired for the membrane to retain a high filtering performance for a long period including a regeneratability by washing, etc., after the use.

As a process for producing a porous membrane of a vinylidene fluoride resin, there has been disclosed a process of mixing an organic liquid, such as diethyl phthalate, and hydrophobic silica as inorganic fine powder with a vinylidene fluoride resin, melt-forming the mixture and then extracting the organic liquid and inorganic fine powder (Patent document 2 below). The thus-obtained porous membrane has a relatively large mechanical strength. However, as an alkaline aqueous solution is used for extracting the hydrophobic silica in the process, the vinylidene fluoride resin constituting the membrane is liable to be deteriorated.

On the other hand, our research group has also made several proposals of process for producing porous membranes of vinylidene fluoride resin used as a microfiltration membrane or a separator of batteries. Those are, for example, a process of subjecting a vinylidene fluoride resin to steps of crystallization, heat treatment, stretching and heat treatment under tension under respectively controlled conditions, thereby forming a porous membrane (Patent document 3 below); a process of forming a film of a vinylidene fluoride resin of a specific molecular weight together with a plasticizer, cooling the film from one side thereof and then extracting the plasticizer (Patent document 4 below); a process of blending with a vinylidene fluoride resin of an ordinary molecular weight, a vinylidene fluoride resin of a high molecular weight for providing an increased heat distortion resistance and an organic pore-forming agent or an inorganic pore-forming agent, forming a film of the blend and then converting the film into a porous membrane by removing the pore-forming agent by extraction or by stretching the film with the inorganic pore-forming agent as stress-concentration nuclei during the stretching in the case of using such an inorganic pore-forming agent (Patent document 5 below); etc. However, in the case of extraction of a plasticizer or an organic pore-forming agent, the resultant porous membrane is liable to fail in exhibiting filtering performance (water permeation rate) or mechanical properties required when the porous membrane is used as a filtration membrane for water treatment. On the other hand, when the stretching of the membrane is tried in order to improve these properties, the membrane is liable to be severed so that a sufficient ratio of stretching cannot be effected. Particularly, in the case of being used as a microfiltration membrane for water treatment, the membrane generally has a thickness of at least 50 μm so as to be durable against the filtration pressure, whereas the stretchability of such a relatively thick membrane having a thickness of at least 50 μm becomes inferior remarkably.

Consequently, there has not been actually obtained a porous membrane of vinylidene fluoride resin which has fine pores of appropriate size and distribution, also has excellent mechanical strengths and is therefore suitable as a microfiltration membrane for water treatment.

Patent document 1: JP-B 50-2176,
Patent document 2: JP-A 3-215535,
Patent document 3: JP-A 54-62273,
Patent document 4: JP-A 7-173323,
Patent document 5: JP-A 2000-309672.

DISCLOSURE OF INVENTION

Accordingly, a principal object of the present invention is to provide a hollow fiber-form porous water filtration membrane of vinylidene fluoride resin having fine pores of appropriate size and distribution and also having excellent mechanical strengths.

Another object of the present invention is to provide a stable and efficient process for producing such a hollow fiber-form porous water filtration membrane of vinylidene fluoride resin.

As a result of study with the above-mentioned objects, the present inventors have confirmed it possible to form a hollow fiber-form porous membrane having generated fine pores of appropriate size and distribution and also retaining good mechanical strength by melt extruding a vinylidene fluoride resin with improved crystallinity together with a solvent and a plasticizer thereof, followed by cooling under a controlled condition to form a film, extracting the plasticizer therefrom and further stretching the film. The thus-formed hollow fiber porous membrane of vinylidene fluoride resin is characterized by the co-presence in mixture of a crystal-oriented portion and a crystal-non-oriented portion recognizable by X-ray diffraction method.

More specifically, the hollow fiber-form porous water filtration membrane of vinylidene fluoride resin according to the present invention is characterized by comprising a vinylidene fluoride resin having a weight-average molecular weight of $2 \times 10^5$-$6 \times 10^5$ and exhibiting a difference $Tm2$-$Tc$ of at most 32° C. between an inherent melting point $Tm2$ (° C.) and a crystallization temperature $Tc$ (° C.) of the resin according to DSC measurement, and also characterized by co-presence in mixture of a crystal-oriented portion and a crystal-non-oriented portion recognizable by X-ray diffraction method.

Further, the process for producing a hollow fiber-form porous water filtration membrane according to the present invention is characterized by comprising: adding 70-250 wt. parts of a plasticizer and 5-80 wt. parts of a good solvent for vinylidene fluoride resin to 100 wt. parts of a vinylidene fluoride resin having a weight-average molecular weight of $2 \times 10^5$-$6 \times 10^5$ and exhibiting a difference $Tm2$-$Tc$ of at most 32° C. between an inherent melting point $Tm2$ (° C.) of and a crystallization temperature $Tc$ (° C.) of the resin according to DSC measurement to form a composition; melt-extruding the composition into a hollow fiber-form; cooling the hollow fiber-form composition from on outside thereof in a cooling medium to form a solidified film; extracting the plasticizer from the film; and further stretching the film.

It is believed that several factors have synergistically contributed to the provision of a hollow fiber-form porous membrane of vinylidene fluoride resin through the process of the present invention. Briefly summarizing, however, it is believed that a hollow fiber-form membrane of vinylidene fluoride resin having a controlled crystallinity and retaining fine pores after the extraction of the plasticizer is formed until the steps of cooling and extraction so that the smooth stretching of a hollow fiber film of vinylidene fluoride resin becomes possible though it has been difficult hitherto, thereby stably providing a hollow fiber porous membrane retaining desired pore size (distribution). As particularly effectively contributing factors, the following may be enumerated.

(a) Owing to an improved crystallinity as represented by $Tm2$-$Tc \leqq 32°$ C. of the vinylidene fluoride resin as a starting material, the crystal growth speed is moderated (suppressed) during the cooling of the hollow fiber film after the melt-extrusion to provide a film having a crystallinity suitable for the stretching thereafter. (b) The cooling from outside of the hollow fiber film after the melt-extrusion provides a moderate distribution of crystallites or phase separation sizes (which are finer on the outer side and are relatively coarser on the opposite side) which favors the smooth stretching thereafter. (c) The extraction of the plasticizer from the hollow fiber film after the solidification by cooling leaves plasticizer-trace pores, which soften the hollow fiber film to facilitate the stretching and provide stretching stress-concentrating nuclei at certain intervals, thus resulting in a hollow fiber membrane retaining an alternation of fibril portions due to stretching and non-stretched nodes, which, as a whole, contribute to a uniform pore size distribution and maintenance of strength of the hollow fiber membrane.

Particularly, as the growth of spherulites (i.e., spherically grown crystallites) is suppressed owing to the above-mentioned improved crystallinity (a), the hollow fiber porous membrane of the present invention exhibits improved water permeability, mechanical strength and stretchability when used as a membrane of microfiltration of water. This is corroborated by an electron microscope observation in the following manner. That is, in the case of forming a hollow fiber porous membrane according to the conventional process, particularly when one having a thickness of at least 50 µm for ensuring a mechanical strength required of a water microfiltration membrane is cooled from one side thereof, a spongy porous texture is observed up to a depth of ca. 50 µm from the cooled outer surface, whereas a texture of aggregated spherulites (i.e., a spherulite texture) is observed at further inner portions to the inner surface. Further, as a result of observation of interior of each spherulite, it is porous as a whole but is composed of a core of a relatively dense resin phase from which a filmy resin phase is radially formed. Thus, the holes in the spherulite are holes that are generally continuous to but end at the center. Accordingly, the spherulites provide a kind of obstacles against the penetration of water and if such a spherulite texture is formed, an effective path of water penetration is limited to pores between the spherulites, so that a water penetration rate corresponding to a porosity cannot be attained due to rounding about the spherulites. Further, insufficient resin bonding at interfaces between the spherulites, results in inferior mechanical strength and stretchability.

Figure 3:
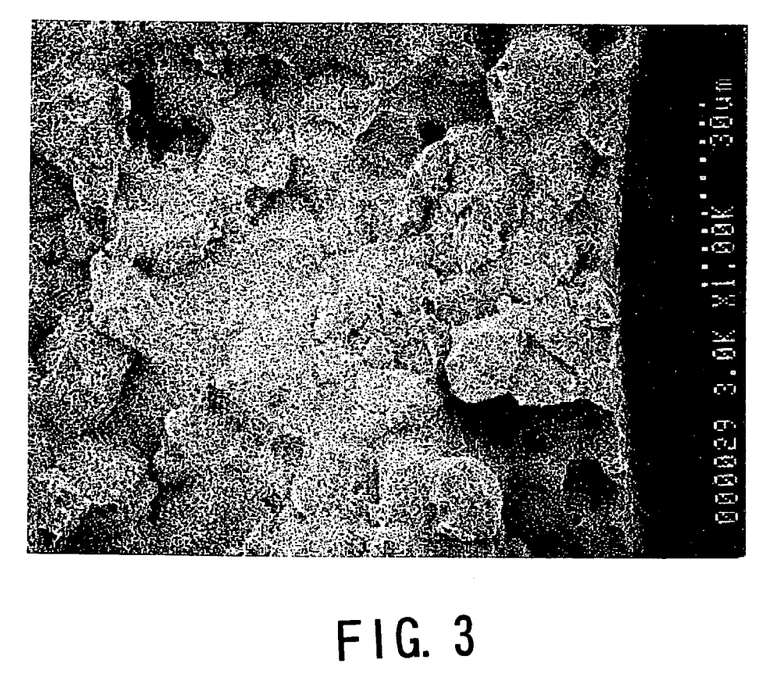
FIG. 3 is a scanning electron microscope picture (×1000) of a cross section in the vicinity of an inner surface (opposite to the cooled surface (the right side of the figure)) of a second intermediate form obtained at a take-up speed of 5 m/min. in order to obtain a porous hollow fiber membrane of vinylidene fluoride resin in Comparative Example 2.
Figure 4:
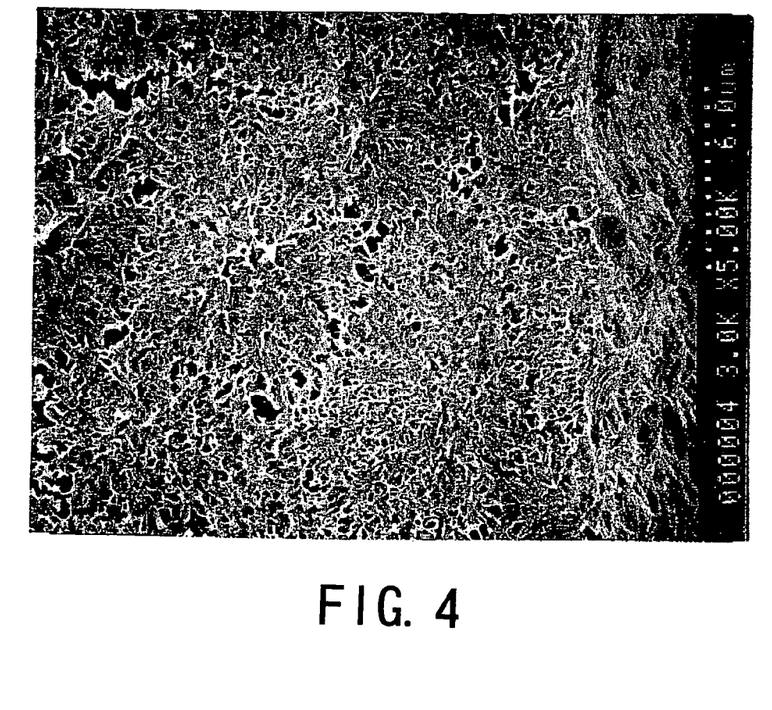
FIG. 4 is a scanning electron microscope picture (×5000) further enlarging the vicinity of the inner surface in FIG. 3.

In contrast thereto, according to the process of the present invention, the formation of a spherulite texture can be suppressed owing to the use of a vinylidene fluoride resin of $Tm2$-$Tc \leqq 32°$ C. As a result, a hollow fiber membrane having improved water permeation rate, mechanical strength and stretchability can be improved, and further stretching thereof allows the formation of a membrane with a further improved water permeation rate. The stretching of a vinylidene fluoride resin the fiber film with spherulites results in severance of the fiber, thus failing to provide a hollow fiber of desired properties (Refer to Comparative Examples 1 and 2 appearing hereinafter, particularly descriptions at a take-up speed of 5 m/min. in a cooling bath identical to Examples and microscopic pictures, FIGS. 3 and 4 for Comparative Example 2) except for a case where the stretching ratio is at such a low level, e.g., ca. 1.3 times (Comparative Example 3) which is insufficient to provide desired improvements in properties.

BEST MODE FOR PRACTICING THE INVENTION

Hereinbelow, the hollow fiber porous membrane of vinylidene fluoride resin of the present invention will be described in order according to the production process of the present invention that is a preferred process for production thereof.

(Vinylidene fluoride resin)

In the present invention, a vinylidene fluoride resin having a weight-average molecular weight (Mw) of $2 \times 10^5$-$6 \times 10^5$ is used as a principal membrane-forming material. If Mw is below $2 \times 10^5$, the mechanical strength of the resultant porous membrane becomes small. On the other hand, if Mw exceeds $6 \times 10^5$, the texture of phase separation between the vinylidene fluoride resin and the plasticizer becomes excessively fine to result in a porous membrane exhibiting a lower water permeation rate when used as a microfiltration membrane for water.

The vinylidene fluoride resin used in the present invention may be homopolymer of vinylidene fluoride, i.e., polyvinylidene fluoride, or a copolymer of vinylidene fluoride together with a monomer copolymerizable with vinylidene fluoride, or a mixture of these. Examples of the monomer copolymerizable with vinylidene fluoride may include: tetrafluoroethylene, hexafluoropropylene, trifluoroethylene, chlorotrifluoroethylene and vinyl fluoride, which may be used singly or in two or more species. The vinylidene fluoride resin may preferably comprise at least 70 mol % as the constituent unit. Among these, it is preferred to use homopolymer consisting of 100 mol % of vinylidene fluoride in view of its high mechanical strength.

A vinylidene fluoride resin of a relatively high vinylidene fluoride content as described above may preferably be obtained by emulsion polymerization or suspension polymerization, particularly preferably by suspension polymerization.

The vinylidene fluoride resin forming the porous membrane of the present invention is characterized by a good crystallinity as represented by a difference $Tm2-Tc$ of at most 32° C., preferably at most 30° C., between an inherent melting point $Tm2$ (° C.) and a crystallization temperature $Tc$ (° C.) of the resin as determined by DSC measurement in addition to the above-mentioned relatively large weight-average molecular weight of $2 \times 10^5$-$6 \times 10^5$.

Herein, the inherent melting point $Tm2$ (° C.) of resin should be distinguished from a melting point $Tm1$ (° C.) determined by subjecting a procured sample resin or a resin constituting a porous membrane as it is to a temperature-increase process according to DSC. More specifically, a vinylidene fluoride resin procured generally exhibits a melting point $Tm1$ (° C.) different from an inherent melting point $Tm2$ (° C.) of the resin, due to thermal and mechanical history thereof received in the course of its production or heat-forming process, etc. The melting point $Tm2$ (° C.) of vinylidene fluoride resin defining the present invention defined as a melting point (a peak temperature of heat absorption according to crystal melting) observed in the course of DSC re-heating after once subjecting a procured sample resin to a prescribed temperature-increase and decrease cycle in order to remove the thermal and mechanical history thereof, and details of the measurement method will be described prior to the description of Examples appearing hereinafter.

The condition of $Tm2-Tc \leq 32°$ C. representing the crystallinity of vinylidene fluoride resin forming the porous membrane of the present invention may possibly be accomplished, e.g., by a lowering in $Tm2$ according to copolymerization, but in this case, the resultant hollow fiber porous membrane is liable to have a lower chemical resistance in some cases. Accordingly, in a preferred embodiment of the present invention, there is used a vinylidene fluoride resin mixture formed by blending 70-98 wt. % of a vinylidene fluoride resin having a weight-average molecular weight (Mw) of $1.5 \times 10^5$-$6 \times 10^5$ as a matrix (or principal) resin and 2-30 wt. % of a high-molecular weight vinylidene fluoride resin having an Mw that is at least 1.8 times, preferably at least 2 times, that of the former and at most $1.2 \times 10^6$, for crystallinity modification. According to such a method, it is possible to significantly increase the crystallization temperature Tc without changing the crystal melting point of the matrix resin alone (represented by $Tm2$ in a range of preferably 170-180° C.). More specifically, by increasing Tc, it becomes possible to accelerate the solidification of the vinylidene fluoride resin at an inner portion of film where the cooling is retarded compared with the film surface(s) and at an inner portion toward an opposite surface in the case of a preferential cooling from one surface, thereby suppressing the growth of spherulites. Tc is preferably at least 143° C.

If Mw of the high-molecular weight vinylidene fluoride resin is below 1.8 times Mw of the matrix resin, it becomes difficult to sufficiently suppress the growth of spherulites. On the other hand, above $1.2 \times 10^6$, the dispersion thereof in the matrix resin becomes difficult.

Further, if the addition amount of the high-molecular weight vinylidene fluoride resin is below 2 wt. %, the effect of suppressing spherulite texture formation is liable to be insufficient, and in excess of 30 wt. %, the texture of phase separation between the vinylidene fluoride resin and the plasticizer is liable to become excessively fine, thus lowering the water permeation rate of the resultant membrane.

According to the present invention, a plasticizer and a good solvent for vinylidene fluoride resin are added to the above-mentioned vinylidene fluoride resin to form a starting composition for formation of the membrane.

(Plasticizer)

As the plasticizer, aliphatic polyesters of a dibasic acid and a glycol may generally be used. Examples thereof may include: adipic acid-based polyesters of, e.g., the adipic acid-propylene glycol type, and the adipic acid-1,3-butylene glycol type; sebacic acid-based polyesters of, e.g., the sebacic acid-propylene glycol type; and azelaic acid-based polyesters of, e.g., the azelaic acid-propylene glycol type, and azelaic acid-1,3-butylene glycol type.

(Good Solvent)

As the good solvent for vinylidene fluoride resin, those capable of dissolving vinylidene fluoride resin in a temperature range of 20-250° C. may be used. Examples thereof may include: N-methylpyrrolidone, dimethylformamide, dimethylacetamide, dimethyl sulfoxide, methyl ethyl ketone, acetone, tetrahydrofuran, dioxane, ethyl acetate, propylene carbonate, cyclohexane, methyl isobutyl ketone, dimethyl phthalate, and solvent mixtures of these. N-methylpyrrolidone (NMP) is particularly preferred in view of its stability at high temperatures.

(Composition)

The starting composition for formation of the membrane may preferably be obtained by mixing 100 wt. parts of the vinylidene fluoride resin with 70-250 wt. parts of the plasticizer and 5-80 wt. parts of the good solvent for vinylidene fluoride resin.

If the plasticizer is below 70 wt. parts, the porosity is lowered to result in an inferior filtration performance (water permeation rate) in the case of a water microfiltration membrane. On the other hand, in excess of 250 wt. parts, the porosity becomes excessively large to result in a lower mechanical strength.

If the good solvent is below 5 wt. parts, it becomes impossible to uniformly mix the vinylidene fluoride resin and the plasticizer or a long time is required for the mixing. On the other hand, in excess of 80 wt. parts, it becomes impossible to attain a porosity corresponding to the added amount of the plasticizer. In other words, the effective pore formation by extraction of the plasticizer is obstructed.

The total amount of the plasticizer and the good solvent is preferably in the range of 100-250 wt. parts. Both of them have a function of lowering the viscosity of the melt-extrusion composition and they function interchangeably with each other to some extent. Among them, the proportion of the solvent is preferably 5-40 wt. %, more preferably 5-35 wt. %, particularly preferably 10-30 wt. %.

(Mixing and Melt-extrusion)

The melt-extrusion composition may be extruded into a hollow fiber film by extrusion through an annular nozzle or a T-die at a temperature of 140-270° C., preferably 150-200° C. Accordingly, the manners of mixing and melting of the vinylidene fluoride resin, plasticizer and good solvent are arbitrary as far as a uniform mixture in the above-mentioned temperature range can be obtained consequently. According to a preferred embodiment for obtaining such a composition, a twin-screw kneading extruder is used, and the vinylidene fluoride resin (preferably in a mixture of a principal resin and a crystallinity-modifier resin) is supplied from an upstream side of the extruder and a mixture of the plasticizer and the good solvent is supplied at a downstream position to be formed into a uniform mixture until they pass through the extruder and are discharged. The twin-screw extruder may be provided with a plurality of blocks capable of independent temperature control along its longitudinal axis so as to allow appropriate temperature control at respective positions depending on the contents of the materials passing therethrough. In the case of using a principal resin and a crystallinity-modifier resin in combination, if the melt-kneading of both resins is insufficient, it can become impossible to achieve a desired increase of Tc, thus an improvement in film-formability.

(Cooling)

In the process of the present invention, the melt-extruded hollow fiber film is cooled from an outside thereof and solidified by passing the extruded film through a cooling medium, such as water. The temperature of the cooling medium can be selected from a broad temperature range of 5-120° C., but may preferably be in a range of 10-100° C., particularly preferably 30-80° C.

(Extraction)

The cooled and solidified hollow fiber film is then introduced into an extraction liquid bath to remove the plasticizer and the good solvent therefrom, thereby forming a hollow fiber membrane. The extraction liquid is not particularly restricted provided that it does not dissolve the vinylidene fluoride resin while dissolving the plasticizer and the good solvent. Suitable examples thereof may include: polar solvents having a boiling point on the order of 30-100° C., inclusive of alcohols, such as methanol and isopropyl alcohol, and chlorinated hydrocarbons, such as dichloromethane and 1,1,1-trichloroethane.

(Heat Treatment)

The hollow fiber film or membrane after the extraction may preferably be heat-treated at a temperature in the range of 80-160° C., preferably 100-140° C., for 1 sec.-18000 sec., preferably 3 sec.-3600 sec., to increase the degree of crystallization, for the purpose of enhancing the effect of increasing the water permeation rate of the subsequent stretching.

(Stretching)

The hollow fiber film or membrane is then subjected to stretching, so as to increase the porosity and pore size and improve the strength-elongation characteristic. It is generally preferred to effect a uniaxial stretching in the longitudinal direction of the film or membrane by means of, e.g., a pair of rollers having different circumferential speeds. This is because it has been found that a microscopic texture including a stretched fibril portion and a non-stretched node portion appearing alternately in the stretched direction is preferred for the porous hollow fiber membrane of vinylidene fluoride resin of the present invention to exhibit a harmony of porosity and strength-elongation characteristic thereof. The stretching ratio may appropriately be 1.2-4.0 times, particularly ca. 1.4-3.0 times. As for the stretching temperature, a temperature of from room temperature to 90° C., preferably 40-80° C., is generally adopted.

The hollow fiber porous membrane after the stretching may preferably be subjected to a heat-setting treatment, e.g., at 80-160° C., for the purpose of size stabilization. In this instance, it is also possible to cause a relaxation (shrinkage) at a relaxation percentage of up to ca. 10% based on the length. Herein, the relaxation percentage means a value calculated according to the following formula:

Relaxation percentage(%)=((length after stretching ($m$)−length after relaxation ($m$))/(length after stretching))×100

(Elution Liquid Treatment)

Through the above-mentioned step, a hollow fiber porous membrane of vinylidene fluoride resin according to the present invention is obtained, but it is also preferred to subject the hollow fiber porous membrane to a treatment of immersion in an elution liquid. This is because, owing to the elution liquid treatment, the hollow fiber porous membrane of the present invention can be provided with a remarkably increased water permeability without essentially impairing the characteristic properties thereof. As the elution liquid, an alkaline liquid, an acidic liquid or an extraction liquid for the plasticizer is used.

The reason why the water permeability of the porous membrane is remarkably increased by the elution liquid treatment has not been fully clarified as yet, but it is presumed that the plasticizer is exposed at the minute pore wall enlarged in diameter by the stretching and is effectively removed by the elution liquid treatment. The alkaline or acidic liquid as the elution liquid is considered to decompose and solubilize the polyester used as the plasticizer for the vinylidene fluoride resin, thereby promoting the elution and removal thereof.

Accordingly, as the alkaline liquid, it is preferred to use an aqueous solution or a solution in water/alcohol of a strong base, such as sodium hydroxide, potassium hydroxide or calcium hydroxide, at a pH of at least 12, preferably 13 or higher. On the other hand, as the acidic liquid, it is preferred to use an aqueous solution or a solution in water/alcohol of a strong acid, such as hydrochloric acid, sulfuric acid or phosphoric acid at a pH of at most 4, preferably 3 or lower, particularly preferably 2 or lower.

Further, as the extraction liquid for the plasticizer, those dissolving the plasticizer without dissolving the vinylidene fluoride resin can be used without particular restriction similarly as the one used before the stretching. For example, polar solvents having a boiling point of ca. 30-100° C. are suitably used, inclusive of alcohols, such as methanol and isopropyl alcohol, and chlorinated hydrocarbons, such as dichloromethane, and 1,1,1-trichloromethane.

The elution liquid treatment may be effected by immersing the hollow fiber membrane in the elution liquid at a temperature of ca. 5-100° C. for 10 sec. to 6 hours, after an optional pre-immersion for improving the affinity to the liquid. In case where the elution liquid treatment is performed at an elevated temperature, it is preferred to fix the hollow fiber membrane so as not to cause the shrinkage thereof during the treatment.

(Hollow Fiber Porous Membrane of Vinylidene Fluoride Resin)

The hollow fiber porous membrane of vinylidene fluoride resin of the present invention obtained as described above may be generally provided with properties, inclusive of: a porosity of 55-90%, preferably 60-85%, particularly preferably 65-80%; a tensile strength of at least 5 MPa, an elongation at break of at least 5%, and when used as a water-filtering membrane, a water permeation rate of at least 5 m$^3$/m$^2$·day at 100 kPa. The thickness is ordinarily in the range of 5-800 μm, preferably 50-600 μm, particularly preferably 150-500 μm. The outer diameter of the hollow fiber may suitably be on the order of 0.3-3 mm, particularly ca. 1-3 mm.

Further, a micro-texture characteristic of the porous membrane of vinylidene fluoride resin according to the present invention is that it comprises a crystalline oriented portion and a crystalline non-oriented portion (random oriented portion) recognizable by X-ray diffraction, which are understood as corresponding to a stretched fibril portion and a non-stretched node portion, respectively.

(X-ray Diffraction Method)

More specifically, the X-ray diffraction characteristics of hollow fiber membrane materials described herein are based on measured results according to the following method.

A hollow fiber membrane was split into halves along a longitudinal direction thereof, and a membrane sample was attached to a sample stand so that its longitudinal direction was oriented vertically. Then, X-rays were incident in a direction perpendicular to the longitudinal direction. The X-ray generator was "ROTAFLEX 200RB" made by Rigaku Denki K.K., and CuKα rays at 30 kV-100 mA and having passed through an Ni filter were used as an X-ray source. An imaging plate ("BAS-SR127" made by Fuji Shashin Film K.K.) was used to photograph a diffraction image at a sample-imaging plate distance of 60 mm.

As a result, the presence in mixture of the crystal oriented portion and the crystal non-oriented portion in the hollow fiber porous membrane of the present invention can be quantitatively represented by X-ray diffraction parameters including a diffraction intensity ratio on the meridian of at least 1.1 between those at diffraction angles 2θ=20.1±1° and 2θ=23.0±1°, and an azimuth intensity distribution curve at 2θ=20.1±1° showing a peak having a half-value width of at most 80°.

(Polarizing Microscope Observation)

The hollow fiber porous membrane of vinylidene fluoride resin according to the present invention is obtained as a result of suppression of spherulite formation and smooth practice of stretching. Accordingly, another characteristic of microscopic texture of the hollow fiber porous membrane of vinylidene fluoride resin according to the present invention is freeness from spherulites recognizable by observation through a polarizing microscope. The method for detection of spherulites is as follows.

A hollow fiber porous membrane is sliced to form a flake, and the flake is then soaked with an organic solvent (e.g., dichloromethane) that penetrates into fine pores of the porous membrane but does not dissolve or swell the porous membrane. The soaked flake sample is then observed through a polarizing microscope (at a magnification of 200-400) under the right angle-cross nicol condition. In case where spherulites are present in the sample, an extinction pattern in the form of a cross called a crossing extinction or Malteze cross.

In the porous membrane of vinylidene fluoride resin according to the present invention, at least a portion of molecular chains is crystallized but the growth thereof in the form of spherulite is suppressed, so that no crossing extinction pattern is observed by the polarizing microscope observation over the whole thickness of the membrane. The fact that the suppression of spherulite formation is attributable to an improved crystallinity of the starting vinylidene fluoride resin represented by Tm2−Tc is also understood from the fact that a similar observation through a polarizing microscope of a non-stretched film as an intermediate product in the process for production of hollow fiber porous membrane according to the present invention allows observation of only irregular pattern of brightness and darkness and does not provide a crossing extinction pattern.

EXAMPLES

Hereinbelow, the present invention will be described more specifically based on Examples and Comparative Examples. The properties other than the above-mentioned X-ray diffraction characteristics described herein including those described below are based on measured values according to the following methods.

(Weight-average Molecular Weight (Mw))

A GPC apparatus ("GPC-900", made by Nippon Bunko K.K.) was used together with a column of "Shodex KD-806M and a pre-column of "Shodex KD-G" (respectively made by Showa Denko K.K.), and measurement according to GPC (gel permeation chromatography) was performed by using NMP as the solvent at a flow rate of 10 ml/min. at a temperature of 40° C. measure polystyrene-based molecular weights.

(Crystalline melting points Tm1, Tm2 and Crystallization Temperature Tc)

A differential scanning calorimeter "DSC-7" (made by Perkin-Elmer Corp.) was used. A sample resin of 10 mg was set in a measurement cell, and in a nitrogen gas atmosphere, once heated from 30° C. up to 250° C. at a temperature-raising rate of 10° C./min., then held at 250° C. for 1 min. and cooled from 250° C. down to 30° C. at a temperature-lowering rate of 10° C./min., thereby to obtain a DSC curve. On the DSC curve, an endothermic peak temperature in the course of heating was determined as a melting point Tm1 (° C.) and an exothermic peak temperature in the course of cooling was determined as a crystallization temperature Tc (° C.). Successively thereafter, the sample resin was held at 30° C. for 1 min., and re-heated from 30° C. up to 250° C. at a temperature-raising rate of 10° C./min. to obtain a DSC curve. An endothermic peak temperature on the re-heating DSC curve was determined as an inherent melting point Tm2 (° C.) defining the crystallinity of vinylidene fluoride resin in the present invention.

(Porosity)

The length and also the outer diameter and inner diameter of a sample hollow fiber porous membrane were measured to calculate an apparent volume V (cm$^3$) of the porous membrane, and the weight W (g) of the porous membrane was measured to calculate a porosity according to the following formula:

Porosity(%)=(1−W/(V×ρ))×100, wherein ρ: density of PVDF (=1.78 g/cm$^3$)

(Water Permeation Rate (Flux))

A sample hollow fiber porous membrane was immersed in ethanol for 15 min., then immersed in water to be hydrophilized, and then subjected to a measurement at a water temperature of 25° C. and a pressure difference of 100 kPa. The test length (i.e., length of a portion used for filtration) of hollow fiber porous membrane was set to 800 mm, and the area of the membrane was calculated based on the outer diameter according to the following formula:

Membrane area($m^2$)=(outer diameter)×π×(test length).

(Average Pore Diameter)

An average pore diameter was measured according to the half dry method based on ASTM F316-86 and ASTM E1294-89 by using "PERMPOROMETER CFP-2000AEX" made by Porous Materials, Inc. A perfluoropolyester (trade name "Galwick") was used as the test liquid.

(Maximum Pore Diameter)

A maximum pore diameter was measured according to the bubble point method based on ASTM F316-86 and ASTM E1294-89 by using "PERMPOROMETER CFP-2000AEX" made by Porous Materials, Inc. A perfluoropolyester (trade name "Galwick") was used as the test liquid.

(Tensile Strength and Elongation at Break)

Measured by using a tensile tester ("RTM-100", made by Toyo Baldwin K.K.) under the conditions of an initial sample length of 100 mm and a crosshead speed of 200 mm/min. in an environment of a temperature of 23° C. and a relative humidity of 50%.

Example 1

A principal polyvinylidene fluoride (PVDF) (powder) having a weight-average molecular weight (Mw) of $2.52 \times 10^5$ and a crystallinity-modifier polyvinylidene fluoride (PVDF) (powder) having Mw=$6.59 \times 10^5$ were blended in proportions of 87.5 wt. % and 12.5 wt. %, respectively, by a Henschel mixer to obtain a mixture A having Mw=$3.03 \times 10^5$.

An adipic acid-based polyester plasticizer ("PN-150", made by Asahi Denka Kogyo K.K.) as an aliphatic polyester and N-methylpyrrolidone (NMP) as a solvent were mixed under stirring in a ratio of 87.5 wt. %/12.5 wt. % at room temperature to obtain a mixture B.

An equi-directional rotation and engagement-type twin-screw extruder ("BT-30", made by Plastic Kogaku Kenkyusyo K.K.; screw diameter: 30 mm, L/D=48) was used, and the mixture A was supplied from a powder supply port at a position of 80 mm from the upstream end of the cylinder and the mixture B heated to 100° C. was supplied from a liquid supply port at a position of 480 mm from the upstream end of the cylinder at a ratio of mixture A/mixture B=37.5/62.5 (wt. %), followed by kneading at a barrel temperature of 210° C. to extrude the melt-kneaded product through a nozzle having an annular slit of 7 mm in outer diameter and 3.5 mm in inner diameter into a hollow fiber-form extrudate at a rate of 13 g/min.

The extruded mixture in a molten state was introduced into a water bath maintained at 60° C. and having a surface 10 mm distant from the nozzle (i.e., an air gap of 10 mm) to be cooled and solidified (at a residence time in water bath of ca. 10 sec.), pulled up at a take-up speed of 5 m/min. and wound up to obtain a first intermediate form.

Then, the first intermediate form was fixed so as not to shrink in the longitudinal direction and, while being kept in the fixed state, was immersed under vibration in dichloromethane at room temperature for 30 min, followed by immersion in fresh dichloromethane again under the same conditions to extract the aliphatic polyester and solvent and further by 1 hour of heating in an oven at 120° C., while being continually fixed, for removal of the dichloromethane and heat treatment, thereby to obtain a second intermediate form.

Then, the second intermediate form was longitudinally stretched at a ratio of 1.6 times at an environmental temperature of 25° C. and then heated for 1 hour in an oven at a temperature of 100° C. for heat setting to obtain a polyvinylidene fluoride-based porous hollow fiber.

The thus-obtained polyvinylidene fluoride-based porous hollow fiber exhibited physical properties including: an outer diameter of 1.486 mm, an inner diameter of 0.702 mm, a thickness of 0.392 mm, a porosity of 72%, a water permeation rate of 18.01 $m^3/m^2 \cdot day \cdot 100$ kPa, an average pore diameter of 0.086 μm, a maximum pore diameter of 0.184 μm, a tensile strength of 9.1 MPa and an elongation at break of 7%.

The production conditions and the physical properties of the resultant polyvinylidene fluoride-based porous hollow membrane are inclusively shown in Table 1 appearing hereinafter together with those of Examples and Comparative Examples described below.

Example 2

The porous hollow fiber obtained in Example 1 was fixed so as not shrink in the longitudinal direction and, while being kept in this state, was immersed in ethanol for 15 min. and then in pure water for 15 min. to be hydrophilized, followed by immersion in 20%-caustic soda aqueous solution (pH14) maintained at 70° C. for 1 hour, washing with water and 1 hour of drying in a warm air oven maintained at 60° C.

Example 3

A porous hollow fiber was obtained in the same manner as in Example 1 except for changing the temperature of the cooling water bath for cooling the melt-extruded mixture to 11° C. and the stretching ratio to 1.8 times.

Example 4

A porous hollow fiber was obtained in the same manner as in Example 3 except for using a mixture A obtained by changing the mixing ratio of the principal PVDF and the modifier PVDC to 50/50 (wt. %) and increasing the air gap to 140 mm.

Figure 1:
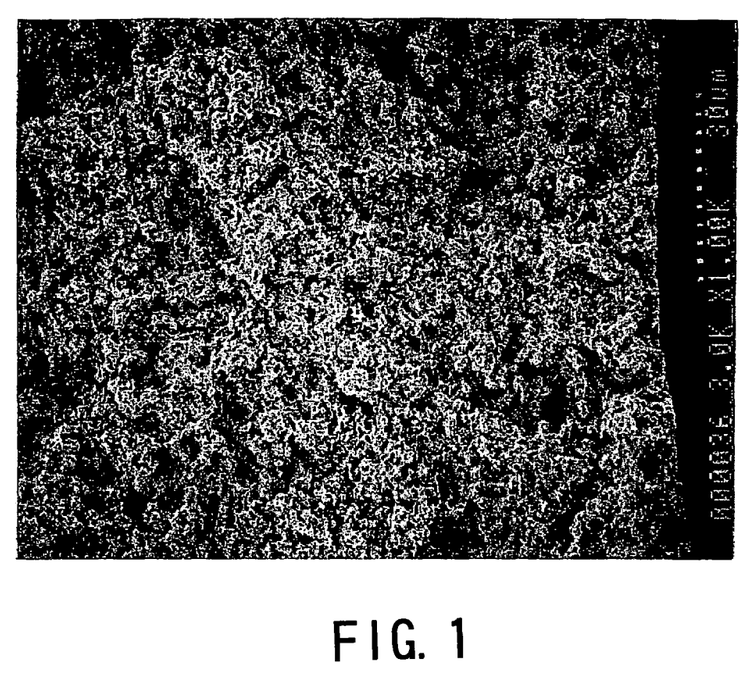
FIG. 1 is a scanning electron microscope picture (×1000) of a cross section in the vicinity of an inner surface (opposite to the cooled surface (the right side of the figure)) of a second intermediate form before stretching in order to obtain a porous hollow fiber membrane of vinylidene fluoride resin in Example 4.
Figure 2:
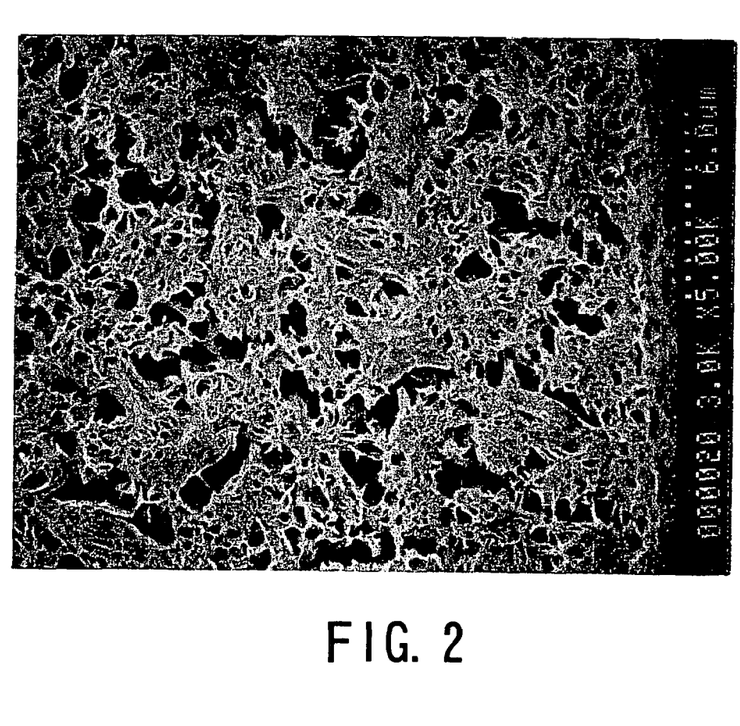
FIG. 2 is a scanning electron microscope picture (×5000) further enlarging the vicinity of the inner surface in FIG. 1.

FIGS. 1 and 2 are scanning electron microscope pictures at magnifications of 1000 and 5000, respectively of a cross section perpendicular to the longitudinal direction and in the vicinity of an inner surface (opposite to the cooled surface, the right side of the respective figures) of a second intermediate form before the stretching for obtaining the hollow fiber membrane in the above Example.

Example 5

A principal polyvinylidene fluoride (PVDF) (powder) having a weight-average molecular weight (Mw) of $2.52 \times 10^5$ and a crystallinity-modifier polyvinylidene fluoride (PVDF) (powder) having Mw=$6.91 \times 10^5$ were blended in proportions of 75 wt. % and 25 wt. %, respectively, by a Henschel mixer to obtain a mixture A having Mw=$3.67 \times 10^5$.

An adipic acid-based polyester plasticizer ("PN-150", made by Asahi Denka Kogyo K.K.) as an aliphatic polyester and N-methylpyrrolidone (NMP) as a solvent were mixed under stirring in a ratio of 87.5 wt. %/12.5 wt. % at room temperature to obtain a mixture B.

An equi-directional rotation and engagement-type twin-screw extruder ("BT-30", made by Plastic Kogaku Kenkyusyo K.K.; screw diameter: 30 mm, L/D=48) was used, and the mixture A was supplied from a powder supply port at a position of 80 mm from the upstream end of the cylinder and the mixture B heated to 100° C. was supplied from a liquid supply port at a position of 480 mm from the upstream end of the cylinder at a ratio of mixture A/mixture B=40/60 (wt. %), followed by kneading at a barrel temperature of 220° C. to extrude the melt-kneaded product through a nozzle having an annular slit of 7 mm in outer diameter and 5 mm in inner diameter into a hollow fiber-form extrudate at a rate of 9.8 g/min. In this instance, air was injected into a hollow part of the fiber at a rate of 6.2 ml/min. through an air supply port provided at a center of the nozzle.

The extruded mixture in a molten state was introduced into a water bath maintained at 60° C. and having a surface 30 mm distant from the nozzle (i.e., an air gap of 30 mm) to be cooled and solidified (at a residence time in water bath of ca. 10 sec.), pulled up at a take-up speed of 5 m/min. and wound up to obtain a first intermediate form. The first intermediate form had an inner diameter of 1.462 mm and an outer diameter of 2.051 mm.

Then, the first intermediate form was fixed so as not to shrink in the longitudinal direction and, while being kept in the fixed state, was immersed under vibration in dichloromethane at room temperature for 30 min, followed by immersion in fresh dichloromethane again under the same conditions to extract the aliphatic polyester and solvent and further by 1 hour of heating in an oven at 120° C., while being continually fixed, for removal of the dichloromethane and heat treatment, thereby to obtain a second intermediate form.

Then, the second intermediate form was longitudinally stretched at a ratio of 1.8 times at an environmental temperature of 25° C. and then, while being kept fixed so as not to shrink in the longitudinal direction, was immersed under vibration in dichloromethane at room temperature for 30 min., followed by immersion in fresh dichloromethane under the same conditions and further by 1 hour of heating in an oven at a temperature of 150° C. for removal of dichloromethane and heat setting to obtain a polyvinylidene fluoride-based porous hollow fiber.

Example 6

A porous hollow fiber was obtained in the same manner as in Example 5 except for using a mixture A obtained by changing the principal PVDF to a PVDF (powder) of Mw=4.12×$10^5$, the modifier PVDF to a PVDF (powder) of Mw=9.36×$10^5$ and the mixing ratio of the principal PVDF and the modifier PVDF to 95/5 (wt. %), using a mixture B obtained by changing the mixing ratio of the plasticizer and the good solvent to 82.5/17.5 (wt. %), and changing the supply ratio of the mixture A and the mixture B to 35.7/64.3 (wt. %), the air gap to 150 mm and the stretching ratio to 1.7 times.

Example 7

A porous hollow fiber was obtained in the same manner as in Example 6 except for changing the nozzle outer diameter to 5 mm, the nozzle inner diameter to 3.5 mm and the air gap to 170 mm.

Comparative Example 1

A porous hollow fiber was obtained in the same manner as in Example 3 except for using a PVDF of Mw=2.52×$10^5$ alone instead of the mixture A and changing the take-up speed to 20 m/min. Incidentally, in a case where the take-up speed was 5 m/min., a porous hollow fiber could not be obtained due to severance of the fiber at the time of stretching.

Comparative Example 2

A porous hollow fiber was obtained in the same manner as in Example 3 except for using a PVDF of Mw=4.92×$10^5$ alone instead of the mixture A, setting the mixing ratio of the PVDF and the mixture B to 42.9/57.1 (wt. %), and changing the air gap to 140 mm, the take-up speed to 10 m/min. and the stretching ratio to 2.0 times.

Incidentally, in a case where the take-up speed was 5 m/min., a porous hollow fiber could not be obtained due to severance of the fiber at the time of stretching. In the case of the take-up speed being 5 m/min., scanning electron microscope pictures at magnifications of 1000 and 5000 were taken with respect to a cross section perpendicular to the longitudinal direction and in the vicinity of an inner surface (the right side of the figures) of a second intermediate form before the stretching and are attached hereto as FIGS. 3 and 4, respectively.

Comparative Example 3

A porous hollow fiber was obtained in the same manner as in Example 3 except for using a PVDF of Mw=6.59×$10^5$ alone instead of the mixture A, setting the mixing ratio of the PVDF and the mixture B to 33.3/66.7 (wt. %), and changing the air gap to 300 mm, the take-up speed to 5 m/min. and the stretching ratio to 1.3 times. Incidentally, at a stretching ratio exceeding 1.3 times, a porous hollow fiber could not be obtained due to severance of the fiber at the time of stretching.

TABLE 1

| | | | Example | | | | | |
|---|---|---|---|---|---|---|---|---|
| | | | 1 | 2 | 3 | 4 | 5 | 6 |
| Starting material composition | Mixture A | Principal PVDF's Mw (×$10^5$) | 2.52 | 2.52 | 2.52 | 2.52 | 2.52 | 4.12 |
| | | Modifier PVDF's Mw (×$10^5$) | 6.59 | 6.59 | 6.59 | 6.59 | 6.91 | 9.36 |
| | | PVDF mixing ratio (wt. %) | 87.5/12.5 | 87.5/12.5 | 87.5/12.5 | 50/50 | 75/25 | 95/5 |
| | | Mixture's Mw (×$10^5$) | 3.03 | 3.03 | 3.03 | 4.56 | 3.67 | 4.38 |
| | Mixture B | Polyester plasticizer | PN-150 | PN-150 | PN-150 | PN-150 | PN-150 | PN-150 |
| | | Solvent | NMP | NMP | NMP | NMP | NMP | NMP |
| | | Plasticizer/solvent mixing ratio (wt. %) | 87.5/12.5 | 87.5/12.5 | 87.5/12.5 | 87.5/12.5 | 87.5/12.5 | 82.5/17.5 |
| | | Mixture A/Mixture B Supply ratio (wt. %) | 37.5/62.5 | 37.5/62.5 | 37.5/62.5 | 37.5/62.5 | 40/60 | 35.7/64.3 |
| Spinning and stretching conditions | | Air gap (mm) | 10 | 10 | 10 | 140 | 30 | 150 |
| | | Water bath temp. (° C.) | 60 | 60 | 11 | 11 | 60 | 60 |
| | | Take-up speed (m/min) | 5 | 5 | 5 | 5 | 5 | 5 |
| | | Stretch ratio | 1.6 | 1.6 | 1.8 | 1.8 | 1.8 | 1.7 |
| | | Elution liquid treatment | none | alkaline liquid | none | none | dichloro-methane | dichloro-methane |

TABLE 1-continued

| | | | | | | | |
|---|---|---|---|---|---|---|---|
| Physical properties | Outer diameter (mm) | 1.486 | 1.558 | 1.549 | 1.620 | 1.626 | 1.570 |
| | Inner diameter (mm) | 0.702 | 0.7155 | 0.736 | 0.542 | 1.133 | 1.065 |
| | Thickness (mm) | 0.392 | 0.421 | 0.407 | 0.539 | 0.247 | 0.253 |
| | Porosity (%) | 72 | 74 | 77 | 72 | 75 | 76 |
| | Water permeation rate ($m^3/m^2 \cdot day \cdot 100$ kPa) | 18.01 | 36.6 | 13.48 | 5.28 | 36.75 | 66.61 |
| | Ave. pore diameter (μm) | 0.086 | 0.096 | 0.072 | 0.065 | 0.129 | 0.130 |
| | Max. pore diameter (μm) | 0.184 | 0.184 | 0.145 | 0.145 | 0.275 | 0.278 |
| | Tensile strength (Mpa) | 9.1 | 7.1 | 8.9 | 13.9 | 17.4 | 11.4 |
| | Elongation at break (%) | 7 | 6 | 8.7 | 77 | 40 | 21 |
| DSC | Tc (° C.) | 144.0 | 144.0 | 144.1 | 146.3 | 146.1 | 145.5 |
| | Tm2 (° C.) | 174.9 | 174.9 | 175.1 | 174.8 | 174.9 | 174.1 |
| | Tm2 − Tc (° C.) | 30.9 | 30.9 | 31.0 | 28.5 | 28.8 | 28.6 |
| *1 | | yes | yes | yes | yes | yes | yes |
| *2 | | no | no | no | no | no | no |

| | | | | Example | | | |
|---|---|---|---|---|---|---|---|
| | | | | 7 | Comp. 1 | Comp. 2 | Comp. 3 |
| Starting material composition | Mixture A | Principal PVDF's Mw (×$10^5$) | | 4.12 | 2.52 | 4.92 | 6.59 |
| | | Modifier PVDF's Mw (×$10^5$) | | 9.36 | none | none | none |
| | | PVDF mixing ratio (wt. %) | | 95/5 | 100/0 | 100/0 | 100/0 |
| | | Mixture's Mw (×$10^5$) | | 4.38 | 2.52 | 4.92 | 6.59 |
| | Mixture B | Polyester plasticizer | | PN-150 | PN-150 | PN-150 | PN-150 |
| | | Solvent | | NMP | NMP | NMP | NMP |
| | | Plasticizer/solvent mixing ratio (wt. %) | | 82.5/17.5 | 87.5/12.5 | 87.5/12.5 | 87.5/12.5 |
| | Mixture A/Mixture B Supply ratio (wt. %) | | | 35.7/64.3 | 37.5/62.5 | 42.9/57.1 | 33.3/66.7 |
| Spinning and stretching conditions | Air gap (mm) | | | 170 | 10 | 140 | 300 |
| | Water bath temp. (° C.) | | | 60 | 11 | 11 | 11 |
| | Take-up speed (m/min) | | | 5 | 20 | 10 | 5 |
| | Stretch ratio | | | 1.7 | 1.8 | 2 | 1.3 |
| | Elution liquid treatment | | | dichloro-methane | none | none | none |
| Physical properties | Outer diameter (mm) | | | 1.570 | 0.742 | 0.904 | 1.66 |
| | Inner diameter (mm) | | | 1.072 | 0.34 | 0.41 | 0.772 |
| | Thickness (mm) | | | 0.249 | 0.201 | 0.247 | 0.444 |
| | Porosity (%) | | | 76 | 71 | 60 | 60 |
| | Water permeation rate ($m^3/m^2 \cdot day \cdot 100$ kPa) | | | 71.48 | 3.89 | 1.05 | 1.76 |
| | Ave. pore diameter (μm) | | | 0.131 | 0.071 | 0.060 | 0.062 |
| | Max. pore diameter (μm) | | | 0.277 | 0.145 | 0.126 | 0.135 |
| | Tensile strength (Mpa) | | | 10.9 | 4.7 | 37.1 | 12.5 |
| | Elongation at break (%) | | | 18 | 5 | 44 | 20 |
| DSC | Tc (° C.) | | | 145.2 | 141.0 | 139.0 | 140.9 |
| | Tm2 (° C.) | | | 174.3 | 176.0 | 173.2 | 172.7 |
| | Tm2 − Tc (° C.) | | | 29.1 | 35.0 | 34.2 | 31.8 |
| *1 | | | | yes | yes | yes | yes |
| *2 | | | | no | no (yes)*3 | no (yes)*3 | yes |

*1 Co-presence of crystal-oriented and -non-oriented portions by X-ray diffraction
*2 Presence of spherulites with respect to films before stretching by polarizing microscope observation
*3 Spherulites were observed at a take-up speed of 5 m/min. in Comparative Examples 1 and 2.

INDUSTRIAL APPLICABILITY

As is understood in view of the results shown in Table 1 above, the present invention provides a hollow fiber porous membrane of vinylidene fluoride resin having pores of appropriate size and distribution and excellent mechanical strengths represented by tensile strength and elongation at break, thus being useful as a microfiltration membrane for water treatment, by forming a composition by blending a vinylidene fluoride resin having a relatively high molecular weight and improved crystallinity represented by Tm2−Tc≦32° C. with a plasticizer and a good solvent, melt-extruding the composition into a hollow fiber-form extrudate, and subjecting the hollow fiber-form extrudate to cooling and solidification from the outside, extraction of the plasticizer and stretching.

The invention claimed is:

1. A hollow fiber-form porous water filtration membrane of vinylidene fluoride resin, comprising a vinylidene fluoride resin having a weight-average molecular weight of $2 \times 10^5$-$6 \times 10^5$ and exhibiting a difference Tm2−Tc of at most 32° C. between an inherent melting point Tm2 (° C.) and a crystallization temperature Tc (° C.) of the resin according to DSC measurement, and characterized by co-presence in mixture of a crystal-oriented portion and a crystal-non-oriented portion recognizable by X-ray diffraction method.

2. A porous water filtration membrane according to claim 1, comprising a vinylidene fluoride resin exhibiting a difference Tm2−Tc of at most 30° C.

3. A porous water filtration membrane according to claim 1, comprising a vinylidene fluoride resin having a crystallization temperature Tc of at least 143° C.

4. A porous water filtration membrane according to claim 1, characterized by freeness from spherulites recognizable by observation through a polarizing microscope.

5. A porous water filtration membrane according to claim 1, wherein the vinylidene fluoride resin is a mixture of 70-98 wt. % of a principal vinylidene fluoride resin having a weight-average molecular weight of $1.5 \times 10^5$-$6 \times 10^5$ and 2-30 wt. % of a crystallinity-modifier vinylidene fluoride resin having a weight-average molecular weight that is at least 1.8 times that of the principal vinylidene fluoride resin and at most $1.2 \times 10^6$.

6. A process for producing a hollow fiber-form porous water filtration membrane, comprising:

adding 70-250 wt. parts of a plasticizer and 5-80 wt. parts of a good solvent for vinylidene fluoride resin to 100 wt. parts of a vinylidene fluoride resin having a weight-average molecular weight of $2 \times 10^5$-$6 \times 10^5$ and exhibiting a difference Tm2–Tc of at most 32° C. between an inherent melting point Tm2 (° C.) and crystallization temperature Tc (° C.) according to DSC measurement, to form a composition;

melt-extruding the composition into a hollow fiber-form;

cooling the hollow fiber-form composition from an outside thereof in a cooling medium to form a solidified film;

extracting the plasticizer from the film; and further stretching the film.

7. A production process according to claim 6, wherein said composition is formed by blending 100 wt. parts of the vinylidene fluoride resin with the good solvent and the plasticizer in a total amount of 100-250 wt. parts including 5-40 wt. % of the good solvent.

8. A production process according to claim 6, wherein the temperature of the cooling medium is 5-120° C.

9. A production process according to claim 6, further including a step of treating the hollow fiber porous membrane after the stretching with an elution liquid.

10. A production process according to claim 9, wherein the elution liquid comprises an alkaline liquid at a pH of at least 12.

11. A production process according to claim 9, wherein the elution liquid comprises an acid liquid at a pH of at most 4.

12. A production process according to claim 9, wherein the elution liquid comprises a liquid for extracting the plasticizer.

* * * * *